United States Patent
Marra et al.

(10) Patent No.: US 6,654,436 B2
(45) Date of Patent: Nov. 25, 2003

(54) STUD ENCLOSURE AND METHOD OF USE

(75) Inventors: Mark A. Marra, West Newton, PA (US); Reginald R. Dulaney, Pittsburgh, PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/973,500

(22) Filed: Oct. 8, 2001

(65) Prior Publication Data

US 2003/0068002 A1 Apr. 10, 2003

(51) Int. Cl.$^7$ ................................................ G21C 19/00
(52) U.S. Cl. ...................... 376/260; 376/262; 376/263; 376/305
(58) Field of Search ................................ 376/260, 262, 376/263, 305

(56) References Cited

U.S. PATENT DOCUMENTS

| | | | | |
|---|---|---|---|---|
| 3,548,704 A | * | 12/1970 | Kutryk | 411/373 |
| 4,223,575 A | * | 9/1980 | Krueger | 29/723 |
| 4,671,518 A | * | 6/1987 | Retz | 137/225 |
| 4,818,476 A | * | 4/1989 | Gasparro | 376/205 |
| 4,820,474 A | * | 4/1989 | Leslie et al. | 138/89 |
| 4,854,798 A | * | 8/1989 | Snyder et al. | 254/29 A |
| 5,101,694 A | * | 4/1992 | Sevelinge et al. | 81/57.24 |

FOREIGN PATENT DOCUMENTS

| | | | |
|---|---|---|---|
| JP | 54-749986 | * | 6/1979 |
| JP | 59-112286 | * | 6/1984 |
| JP | 61-24810 | * | 2/1986 |
| JP | 63-269095 | * | 11/1988 |
| JP | 2001-21677 | * | 1/2001 |

OTHER PUBLICATIONS

Etherington, Nuclear Engineering Handbook, McGrawHill, First Ed., 1958, p. 1–147.*

* cited by examiner

Primary Examiner—Michael J. Carone
Assistant Examiner—R Palabrica

(57) ABSTRACT

A stud enclosure for protecting a stud extending upwardly from a nuclear reactor pressure vessel (RPV) flange has a cylindrical can with a capped end and an open end. The capped end has an axially extending hole with a screw extending therein for fastening the stud enclosure to the stud. A seal ring is disposed adjacent the open end of the cylindrical can for sealing the ring on the RPV flange. A gas valve is disposed in the capped end of the cylindrical can for pressurizing the interior portion of the can with air.

The stud enclosure is used to protect the RPV studs after the RPV head has been removed in order to permit access to the interior portions of the RPV. This use includes the steps of: removing RPV fastener nuts and washers from RPV studs extending from the RPV flange through stud holes in the flange of the RPV head while the RPV head is supported on the RPV flange; placing stud enclosures over the studs and into physical contact with the RPV flange while the RPV head is supported on the RPV; fastening the stud enclosures to the studs; and pressurizing the internal portion of the stud enclosures with a gas.

6 Claims, 1 Drawing Sheet

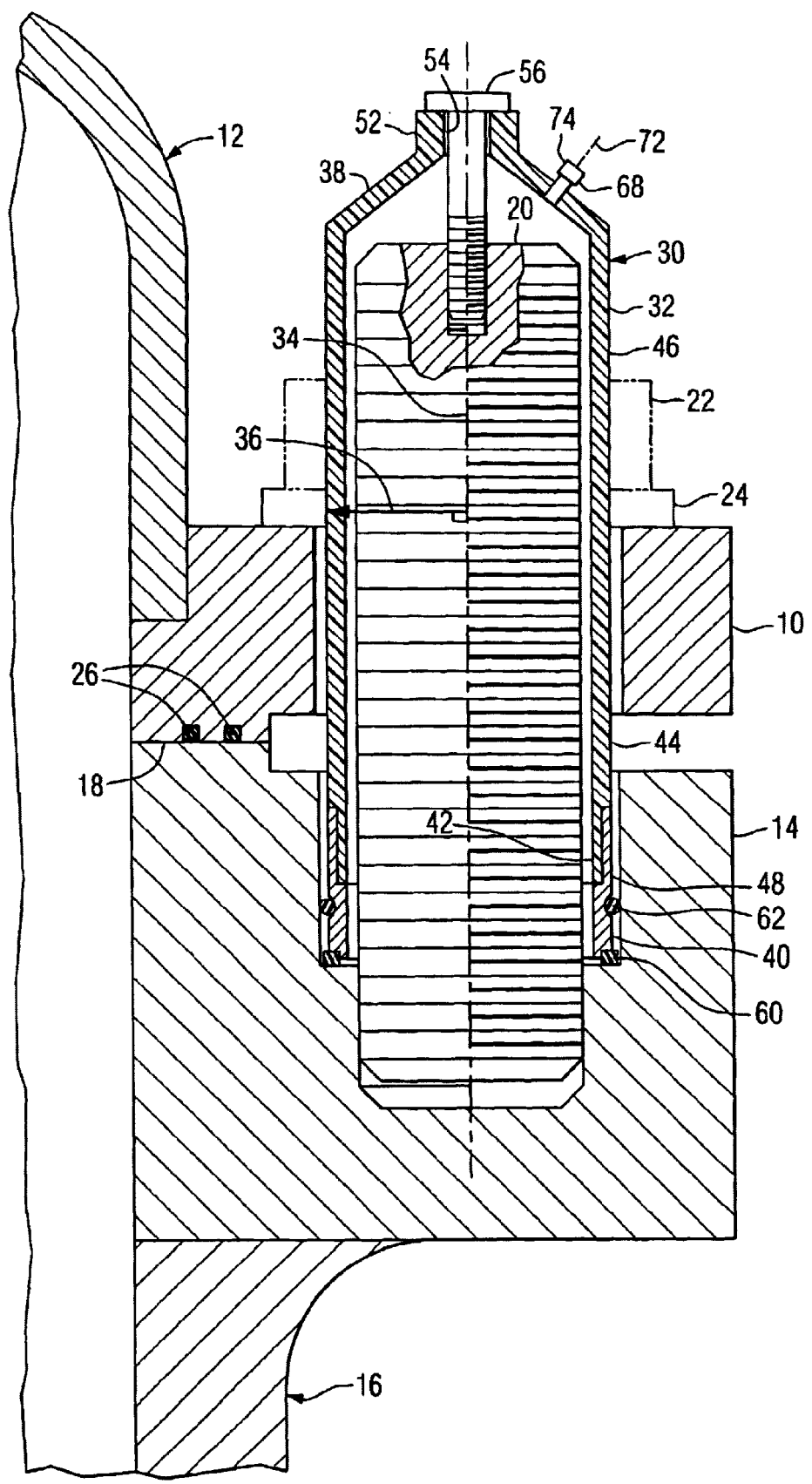

STUD ENCLOSURE AND METHOD OF USE

BACKGROUND OF THE INVENTION

The invention relates to a stud enclosure for protecting a stud member of a stud/nut fastening system designed to maintain a removable vessel head against a pressure vessel and to a method of using the stud enclosure to protect the stud from corrosion when the head must be removed. More particularly, the invention relates to a stud enclosure for protecting a stud extending upwardly of a flange of a nuclear reactor pressure vessel ("RPV") when the RPV is submerged in a borated pool of water and the RPV head is removed in the course of a refueling outage or an inspection outage.

Commercial nuclear plants for generating electric power, including pressurized water reactors and boiling water reactors, are taken off-line on a periodic basis and the RPVs are opened in order to refuel or inspect the RPVs. Many steps must be performed on a critical path schedule to permit safe access to the internal regions of a RPV. In accordance with current procedures, up to fifty four or more large, heavy RPV studs fastening the removable RPV head to the RPV, are detensioned by several suspended detensioners operating simultaneously. The RPV nuts, washers and studs are removed and the RPV stud holes are plugged. The RPV head is then moved to a remote stand, the reactor cavity and refueling canal are flooded and the refueling or inspection operations are performed. Upon completion of the refueling or inspection operations, the reactor cavity and refueling canal are drained and the RPV head is then replaced on the RPV flange. After placing the RPV head on the RPV flange, the studs, washers and nuts are replaced and the nuts retensioned. Many of these steps and their auxiliary steps require the use of the plant's overhead polar crane so that the crane is not then available for other tasks.

The studs are removed from the RPV to prevent corrosion caused by a sequence of events including the exposure of the studs to boron-containing water when the RPV is submerged in a refueling pool and the subsequent exposure of the studs to simultaneous high temperatures and high stresses during on-line operations. Similarly, the stud holes in the RPV flange are plugged to protect them from corrosion.

SUMMARY OF THE INVENTION

It is an object of the present invention to provide a stud enclosure for protecting RPV studs extending from a RPV flange from corrosion resulting from submersion in the refueling pool during an off-line operation. It is another object of the present invention to reduce the number of tasks that need to be performed by the plant's polar crane during an off-line operation.

With these objects in view, the present invention resides in a stud enclosure for protecting a stud upwardly extending from a nuclear reactor pressure vessel (RPV) flange. The stud enclosure includes a cylindrical can having an open end and a capped end. The capped end has an axially extending hole therein and a fastener member extends through the axially extending hole in the capped end. Advantageously, the fastener member can be employed to threadedly engage an axially extending hole in the end of the RPV stud. A seal ring is adjacent the open end of the cylindrical can. Advantageously, the seal ring can form a seal with the RPV flange when the stud enclosure is positioned over a RPV stud. A gas valve is disposed in the capped end of the cylindrical can. Advantageously, the gas valve can be employed to introduce gas into the interior portion of the stud enclosure to raise the interior pressure to about 10 psi (which is equivalent to about 22 feet of water) when the stud enclosure is seated on a RPV flange to resist the head of water in the refueling pool and to retard leaks into the enclosure.

The present invention also involves the method of protecting a stud extending from a nuclear reactor pressure vessel (RPV) flange. In accordance with the practice of this method, a fastener nut and washer are removed from threaded engagement with a stud extending from a RPV flange and through a stud hole of a flange of a removable RPV head supported on the RPV. A stud enclosure is placed over the stud and into physical contact with the RPV flange while the RPV head is supported on the RPV flange. The stud enclosure is fastened to the stud and the internal portion of the stud enclosure is pressurized with a gas, e.g., plant air. Advantageously, the practice of the present invention reduces the demands upon the use of the plant's polar crane so that the critical path time can be relaxed. Also, the exposure of workers to radiation will be reduced. It has been estimated that up to about seven hours could be saved during an outage. In addition, the practice of the present invention would also save the effort required to handle, clean and re-lubricate the studs and stud holes.

BRIEF DESCRIPTION OF THE DRAWINGS

The invention as set forth in the claims will become more apparent from the following detailed description of a preferred embodiment thereof shown, by way of example only, in the accompanying drawing, wherein:

FIG. 1 is a schematic representation of a RPV with one of its studs protected by a stud enclosure of the present invention.

DESCRIPTION OF THE PREFERRED EMBODIMENT

Referring now to FIG. 1 there is generally shown a flange 10 of a removable RPV head 12 supported on a flange 14 of a RPV 16 at a flange interface 18. A commercial RPV may have up to fifty four studs (represented by stud 20) extending upwardly through stud holes in the RPV head flange 10. A stud 20 may have a diameter of up to about seven inches or more and may weigh up to 775 pounds. During on-line power generation operations, large heavy nuts and washers (depicted by nut 22 and washer 24 shown in chain) are engaged with the studs 20 for maintaining a leak tight seal between the flanges 10, 14 at O-rings 26 while the reactor coolant system operates at pressures of up to 2250 psi or more and at temperatures of up to about 600° F. or more. During subsequent off-line operations, the RPV nuts 22 and washers 24 and the RPV head 10 must be removed to permit access to the internal portions of the RPV 16 (after the internal pressure and temperature in the RPV 16 are reduced to approximately atmospheric pressure and to below about 150° F.).

FIG. 1 generally depicts the RPV head 12 after the RPV nuts 22 and washers 24 have been removed from the RPV studs 20. As shown, each of the studs 20 is protected by a stud enclosure 30 of the present invention. The stud enclosure 30 includes a cylindrical can 32 having a longitudinal axis 34 and a cross sectional radius 36 extending at a right angle to the axis 34. The cylindrical can 32 has a capped end 38, an open end 40, an inner surface 42 and an outer peripheral surface 44. The cylindrical can 32 as shown in FIG. 1 preferably includes a fiberglass portion 46 with a stainless steel end piece 48 fit thereto. Alternatively, the cylindrical can 32 may be entirely fabricated of a suitably strong material.

The capped end 38 of the cylindrical can 30 shown in FIG. 1 has a structurally re-enforced collar 52 with an axially extending hole 54 for receiving a fastener 56 such as a cap screw. An elastomeric O-ring (not shown) or other sealing device may be employed under the head of the fastener 56 to provide an airtight seal. The fastener 56 is designed to threadedly engage the upper end of the stud 20 for fastening the stud enclosure 30 over the stud 20.

A seal ring 60 such as an EPDM (ethylene proplyene dimer monomer) ring is provided adjacent or near the open end 40 of the cylindrical can 32. The seal ring 60 may be adhesively bonded to cylindrical can 32. The seal ring 60 is designed to seat in a countersunk stud hole on the RPV flange 14 and form a substantially water tight seal. Advantageously, the seal ring 60 shown in FIG. 1 may be compressed between the can 32 and the flange 14 as the fastener 56 is screwed into the stud 20. In addition to a square cross section as is shown in FIG. 1, the seal ring 60 may have an "O" or any other suitable cross-section for sealingly engaging the RPV flange 14. Also, the seal ring 60 may be carried on the end of the can 32 as shown or in other seal designs on the peripheral cuter surface 44 of the can 32 (and adhesively attached thereto) so long as the seal ring 60 will not readily separate from the can 32 while being transported or while in use. In addition, the stud enclosure 30 may have a second seal ring 62 near the open end 40 and disposed on its peripheral outer surface 44. Advantageously, the second seal ring 62 can also support the sides of the stud enclosure 30 against the sides of a countersunk stud hole. As is shown in FIG. 1, the second seal ring 62 may be an O-ring. In other embodiments of the invention, only one seal ring 60 may be enployed or an inflatable seal ring 60 and/or an inflatable second seal ring may be employed.

A gas valve 68 is disposed in the capped end 38 of the stud enclosure 30 for pressurizing the interior portion of the stud enclosure 30. Preferably the valve 68 is an air valve such as an automobile tire valve that permits a gas (such as plant air) to be introduced into and bled from the interior portion of the stud enclosure 30. FIG. 1 depicts an air valve 68 having a longitudinal axis 72 that intersects the fastener 56. Also, the valve 68 shown in FIG. 1 has a distal end 74 that is within the radius 36 of the cylindrical can 32. Advantageously, this design tends to protect the valve 68 from physical contact with objects adjacent the stud enclosure 30. As is shown in FIG. 1 for purposes of illustration, the distal end of the valve may extend outwardly of the surface of the stud enclosure 30. Most preferably, the distal end of the valve does not extend outwardly of the surface of the stud enclosure 30.

Advantageously, pressurizing the interior portion of the stud enclosure 30 tends to prevent boron-containing water in the refueling pool in which the RPV 16 would be submerged from contacting the threads of the RPV stud 20. In addition, pressurizing the stud enclosure 30 tends to reinforce the stud enclosure 30 against the weight of the approximately 20 to 25 feet of water above it.

Stud covers 30 are particularly useful for protecting the RPV studs 20 during a refueling outage. After the RPV 16 has been taken off-line, cooled down below about 150° F. and to atmospheric pressure, the RPV nuts 22 and washers 24 may be removed from threaded engagement with the studs 20 using known detensioners. While the RPV head 12 remains in place, the stud covers 30 may be slid over the studs 20 and downwardly to the point where a gasket or other seal ring 60 physically contacts the RPV flange 14. The stud covers 30 may be about seven inches in diameter by about four feet high by about fifty thousandths of an inch thick in order to fit over the studs 20 and within the countersunk stud holes of a RPV flange 14. The stud enclosure 30 depicted in FIG. 1 may weigh about ten pounds and may be readily handled by a technician. The stud enclosures 30 may be fastened in place by tightening cap screws or other fasteners 56 into the studs 20. Advantageously, the seal rings 60 may be compressed by tightening the fasteners 56 to the studs 20. After the stud enclosures 30 have been fastened to the studs 20, the interior portions of the stud enclosures 30 may be pressurized to about 10 psi or more to reinforce the capped ends 28 of the cylindrical cans 22 against the weight of approximately twenty feet of water above them and to later protect the threads of the studs 16 from the water in the refueling pool.

After the stud enclosures 30 have been installed, the reactor cavity and refueling canal above the RPV may be flooded with water in accordance with the industry's practice to shield workers and the plant from radiation. The RPV head 12 may be raised from the RPV 16 and placed on a remote stand (not shown) in the refueling canal. With the interior portions of the RPV 16 exposed, the fuel (not shown) may be removed and/or the RPV 16 inspected. At the end of the outage, the RPV head 12 may be repositioned on the RPV 16 and the pool water pumped into a refueling tank (not shown). The pressure in the stud enclosures 30 may then be relieved thorough valves 68 and the cap screws or other fasteners 56 unscrewed so that the stud closures 30 can be removed. The RPV nuts 22 and washers 24 may then be replaced and the reactor returned to on-line operations.

While a present preferred embodiment of the present invention has been shown and described, it is to be understood that the invention may be otherwise variously embodied within the scope of the following claims of invention.

What is claimed is:

1. A method of protecting a stud extending from a nuclear reactor pressure vessel (RPV) flange, comprising the steps of:

removing a fastener nut and washer from a threadedly engaged stud extending from a RFV flange through a stud hole of a flange of a removable RPV head supported on the RPV flange;

placing a stud enclosure over the stud and into physical contact with the RPV flange while the RPV head is supported on the RPV, the stud enclosure having an internal portion;

fastening the stud enclosure to the stud; and pressurizing the internal portion of the stud enclosure with a gas to above atmospheric pressure.

2. The method of claim 1, wherein the step of fastening the stud enclosure to the stud urges the stud enclosure into sealing contact with the RPV flange.

3. The method of claim 1, wherein the step of pressuring the internal portion of the stud enclosure with a gas comprises: pressurizing the stud enclosure with air.

4. The method of claim 1, wherein the step of pressurizing the internal portion of the stud enclosure with a gas comprises: pressurizing the stud enclosure to a pressure of 10 psi.

5. The method of claim 1, wherein the step of pressurizing the internal portion of the stud enclosure with a gas comprises: pressurizing the stud enclosure to a pressure of more than 10 psi.

6. The method of claim 1, wherein the stud has an upper end, the stud enclosure has a capped end and the step of fastening the stud enclosure to the stud comprises: fastening the capped end of the stud enclosure to the upper end of the stud.

* * * * *